United States Patent [19]

Goren et al.

[11] E Re. 29,478

[45] Reissued Nov. 22, 1977

[54] SINGLE COLUMN SEMISUBMERSIBLE DRILLING VESSEL

[75] Inventors: Yoram Goren, Los Angeles, Calif.; Samuel H. Lloyd, III, Houston, Tex.

[73] Assignee: Santa Fe International Corporation, Orange, Calif.

[21] Appl. No.: 630,752

[22] Filed: Nov. 10, 1975

Related U.S. Patent Documents

Reissue of:

[64] Patent No.: 3,771,481
Issued: Nov. 13, 1973
Appl. No.: 139,765
Filed: May 3, 1971

[51] Int. Cl.[2] ..... B63B 35/44

[52] U.S. Cl. ..... 114/265; 61/94; 114/256

[58] Field of Search ..... 114/.5 D, 43.5 R, 256, 114/258, 264, 265, 266; 61/46.5, 86, 87, 92, 94; 175/7

[56] References Cited

U.S. PATENT DOCUMENTS

| | | | |
|---|---|---|---|
| 2,375,286 | 5/1945 | Creed | 61/46.5 |
| 2,946,566 | 7/1960 | Samuelson | 114/.5 D |
| 2,973,046 | 2/1961 | McLean et al. | 61/46.5 |
| 3,246,476 | 4/1966 | Wolff | 114/.5 D |
| 3,490,406 | 1/1970 | O'Reilly et al. | 114/.5 D |
| 3,610,193 | 10/1971 | Lacy et al. | 114/.5 D |
| 3,653,349 | 4/1972 | Brown | 114/.5 D |

*Primary Examiner*—Trygve M. Blix
*Assistant Examiner*—Charles E. Frankfort
*Attorney, Agent, or Firm*—LeBlanc & Shur

[57] ABSTRACT

The vessel comprises a pair of laterally spaced elongated hulls having a plurality of upstanding columns spaced along outboard portions of the hulls. In the preferred form, a central column supports a working platform in spaced relation above the hulls. The hulls buoyantly support the vessel in a low draft condition with the hulls having freeboard. The hulls and outboard columns have ballast compartments for ballasting and deballasting the vessel to respectively submerge the hulls, outboard columns, and a portion of the central column to provide a high draft condition with the mean waterline located intermediate the height of the central column and between the platform and the upper ends of the outboard columns, and return the vessel to a low draft condition. The outboard columns provide stability to the vessel during the initial portion of its transition from the low draft condition to the high draft condition and in the final portion of its transition from the high to the low draft condition. Stability in the high draft condition is predominantly provided by locating the center of gravity below the center of buoyancy. Drilling operations in the high draft condition are effected through the central column which also provides decks for mud handling, storage, etc.

45 Claims, 15 Drawing Figures

INVENTORS
YORAM GOREN
SAMUEL H. LLOYD III
BY
LeBlanc & Shur
ATTORNEYS

SINGLE COLUMN SEMISUBMERSIBLE DRILLING VESSEL

Matter enclosed in heavy brackets [ ] appears in the original patent but forms no part of this reissue specification; matter printed in italics indicates the additions made by reissue.

This invention relates to a variable draft vessel and particularly relates to a variable draft deep water drilling vessel having twin hulls and a single central column mounting a drilling platform.

In attempts to locate new oil fields, an increasing and significant quantity of well drilling has been conducted in offshore sea and like locations where a substantial body of water overlies the oil field. This has generated considerable interest and effort in offshore, both shallow and deep water, exploratory drilling. Current offshore drilling is generally limited to relatively shallow water depths. Deep water exploratory drilling has heretofore been accomplished with the employment of specifically designed and constructed vessels or rigs which have certain inherent disadvantages and limitations noted hereinafter. A brief review of offshore exploratory drilling methods heretofore practiced and the vessels or rigs employed therewith will provide a more clear appreciation and understanding of the present invention, as well as a clear distinction between those vessels or rigs employed in shallow water drilling and those employed in deep water drilling.

An early method of offshore drilling, still currently employed, provides for the erection of a self-contained fixed platform which is supported by pilings driven into the sea floor and has a drilling rig, auxiliary equipment and crew's quarters located on the platform. At the conclusion of the drilling, a tender or derrick barge is brought to dismantle and remove the drilling equipment and, in the case of a dry hole, the entire self-contained platform is dismantled and removed. A variation of the foregoing method provides a somewhat smaller platform similarly erected on piles and having a drilling rig located thereon while the auxiliaries, equipment and crew are located in a tender tied alongside. At the conclusion of the drilling, the platform is likewise either left for oil production or is dismantled and removed in the case of a dry hole. The latter two methods are largely applied for production drilling and not exploratory. Another method employs a self-elevating barge which is towed to the drilling site and provided with columns or legs which are then lowered and embedded in the sea floor. The barge is then jacked up so as to clear the water surface and serves as a platform on which the drilling rig, crew, and auxiliary equipment are subsequently positioned for drilling operation. At the conclusion of the drilling, in the event of a producing well, a fixed platform is generally erected for continuing oil production and the self-elevating barge is towed to another drilling site. The foregoing methods are each feasible for use in relatively shallow water depths of normally 300 feet or less. The factors governing construction and operation of the vessels or rigs utilizing any of the foregoing arrangements are not significantly concerned with stability, motion, and other problems involved in conducting drilling operations from a floating platform, as in deeper water drilling, since the above discussed rigs and vessels are constructed for sea bottom engagement.

Deep water exploratory drilling is usually accomplished by means of surface floating drilling vessels which are either towed or self-propelled to the drilling site and are self-contained in that the drilling rig, auxiliary equipment and crew's quarters form an integral part of the vessel. These floating drilling vessels are anchored over the drilling site and are normally provided with a central opening through which the drilling rig is operated. Drilling operations from these floating vessels are, however, highly restricted by sea state conditions, since excessive vessel motion in heave, pitch and roll can and does damage the drilling equipment, as well as aggravate the problem of maintaining the vessel anchored directly over the drilling site. The stability and motion characteristics of such a single-hulled drilling vessel are accordingly not conducive to efficient oil drilling operations. A twin hulled or catamaran type oil drilling vessel has been constructed; however, while that vessel affords greater stability than a single-hulled vessel, it involves substantial problems which include excessive vessel motion due to wave action, no substantial motion minimizing characterstics, overstability including a low natural period and resultant "snapping" action which tosses personnel about and may endanger the drill string and other equipment. Accordingly, while these vessels are not geographically limited to offshore drilling operations, they are limited to use in restricted or calm waters.

Deep water exploratory drilling operations have also employed semisubmersible platforms, which, like the floating vessels, are completely self-contained. In this latter type, the platform is supported by a plurality of structural members including stabilizing columns joined at their lower ends to a base flotation structure which, when in unballasted condition, floats the entire structure above the surface of the water in a low draft condition with the base structure having freeboard. The columns are spaced from one another and are usually arranged substantially symmetrically about the outboard extremities of the platform. After being towed in freeboard condition to the drilling site, the base flotation structure is ballasted to submerge the same and portions of the columns whereupon the vessel obtains a high draft condition. The drilling platform is maintained above water in the high draft condition by the displacement of the submerged portions of the columns and the residual displacement of the base structure. Platform stability about pitch and roll axes is provided by the righting moments generated by the waterplane areas of the columms located outboard of the center of the platform.

In one type of these prior semisubmersible platforms, the stabilizing columns form substantially symmetrical equilateral polygons with the columns located at the apices of the respective polygons which are normally square or triangular in shape. The equilateral symmetrical polygonal arrangement provides substantially identical righting moments about the roll and pitch axes, as well as any intermediate axes, regardless of wave direction. Another form of similar semisubmersible vessel includes a plurality of stabilizing columns interconnected adjacent their upper ends so that only the columns float in the water, with the columns again being arranged in a symmetrical equilateral polygon. In general, while such prior vessels of this type provide adequate stability for well drilling operations, they have an inherent disadvantage of very low mobility between drilling sites due to the shape and frontal area of the polygonally arranged columns and/or base structure presented to the water surface when such vessels are towed; their towing speed often does not exceed 2 knots.

A variable draft drilling vessel which has achieved adequate stability for well drilling operations in a high draft condition and which has eliminated the serious disadvantage of very low mobility between drilling sites common to prior semisubmersible platforms, has been constructed and utilized. Such vessel is described and illustrated in U.S. patent application Ser. No. 766,662 filed Sept. 4, 1968 as a continuation-in-part of application Ser. No. 666,395 filed Sept. 8, 1967, now abandoned, both of which applications are of common assignee herewith. As disclosed in those applications, that vessel is characterized by a pair of hulls in spaced side-by-side substantially parallel relation one to the other with each hull mounting a plurality of upstanding columns supporting a drilling platform at their upper ends. Particular features of that vessel include high mobility between drilling sites, adequate stability in the high draft condition over the drilling site, and vessel motion minimizing characteristics whereby the vessel is substantially non-responsive to excitation forces caused by wind and wave action. This vessel has performed successfully in various drilling areas throughout the world.

While the columns of the foregoing described vessels, when the latter lie in the high draft condition, do provide reduced areas against which excitation forces act in the high draft condition, such forces, when acting on the columns, do cause some vessel motion in roll, pitch and heave. These vessels, in the high draft condition, are also characterized by the positive righting moments generated by columns spaced about the outer extremities of the vessels. That is to say, the location of the columns about the outer extremities of the vessel and the significant waterplane areas provided thereby provide the sole righting moments necessary to the stability of these vessels in the high draft condition. The location and size of the columns of these prior vessels is thus the most significant criteria governing their stability characteristics in the high draft condition.

Accordingly, it is a primary object of this invention to provide a new improved twin hull variable draft vessel which provides various advantages in construction, mode of operation and result over such prior rigs and vessels.

It is another object of the present invention to provide a variable draft vessel which, in the high draft floating condition, has the characteristic of minimized vessel motion due to excitation forces caused by wave action (hereinafter called "motion minimizing characteristic") while maintaining adequate stability.

It is a related object of the present invention to provide a twin hull variable draft vessel having rapid mobility in transit.

It is still another object of the present invention to provide a twin hull variable draft vessel which is operable in great depths of water as a self-contained drilling vessel.

It is a further object of the present invention to provide a variable draft vessel having twin hulls which has a drilling platform mounted on a deck and which has improved minimum motion characteristics in the high draft condition.

It is still a further object of the present invention to provide a variable draft drilling vessel having a reduced waterplane area in the high draft drilling condition.

It is still a further object of the present invention to provide an improved deep water drilling vessel having twin hulls, the draft of which vessel is variable by ballasting and deballasting action to selectively orient the vessel in a low draft floating condition with the hulls having freeboard and a high draft stabilized floating condition.

It is a related object of the present invention to provide a vessel having a draft variable between high and low draft conditions wherein the center of gravity is located above the center of buoyancy in the low draft condition and below the center of buoyancy in the high draft condition and further characterized in that the predominant contribution to overall vessel stability in the high draft condition is provided by the "pendulum type" stability afforded by locating the center of gravity substantially below the center of buoyancy and with a minimum contribution to overall vessel stability being afforded by the waterplane area of the central column.

It is a further related object of the present invention to provide a variable draft deep water drilling vessel having twin hulls, and a plurality of columns arranged generally about its lateral extremities to provide stability during an initial portion of the transition of the vessel from the low to the high draft condition and during the final portion of its transition from the high draft to the low draft condition.

It is another related object of the present invention to provide a deep water drilling vessel having a draft variable between a low draft in-transit condition and a high draft drilling condition wherein stability is provided in a near low draft condition by righting moments generated by columns located generally about the lateral extremities of the vessel and in a near high draft and high draft conditions predominantly by a righting moment provided by locating the center of gravity of the vessel below its center of buoyancy.

It is still another related object of the present invention to provide a variable draft deep water drilling vessel having a plurality of stability columns arranged generally about its lateral extremities and a central column supporting a drilling platform above a pair of hulls characterized in that the mean waterline in the high draft condition lies intermediate the drilling platform and the upper ends of the stability columns with the columns completely submerged thereby minimizing the area of the vessel exposed to wind and wave excitation forces in the high draft condition.

These and other related objects and advantages of the present invention will become more apparent from the following specifications, claims, and appended drawings wherein:

Figure 7:
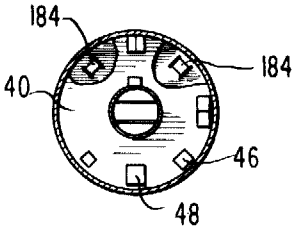
Figure 9:
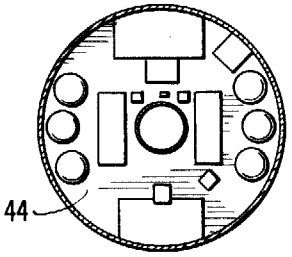
Figure 8:
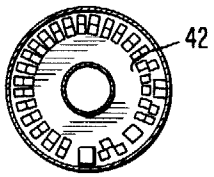
Figure 6:
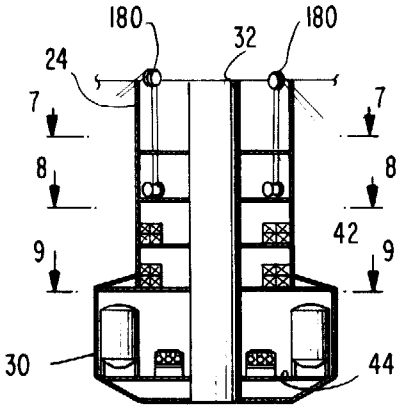
FIG. 6 is an enlarged vertical cross sectional view of the central column.
Figure 14:
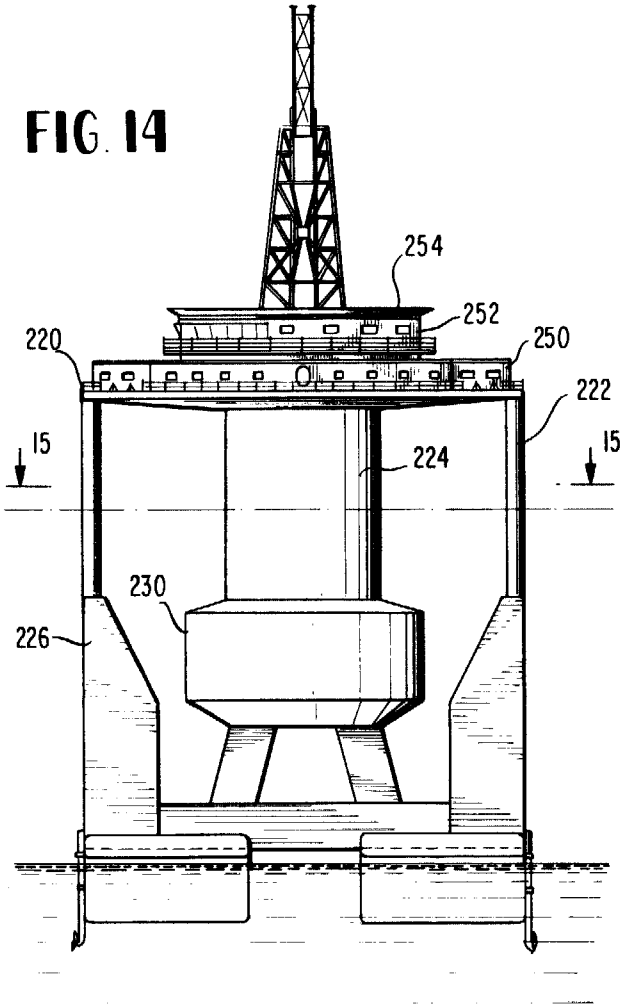
Figure 10:
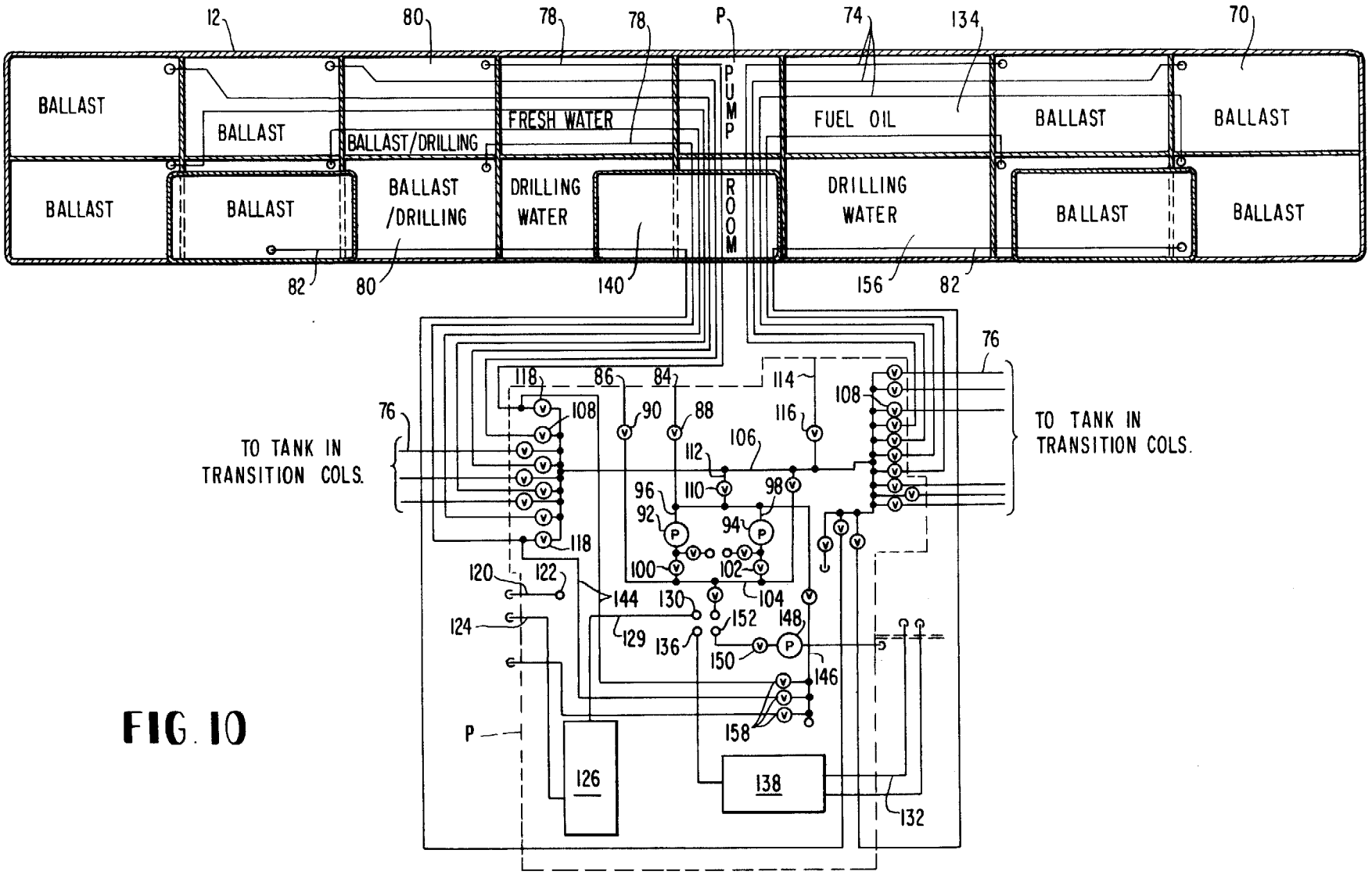
Figure 11:
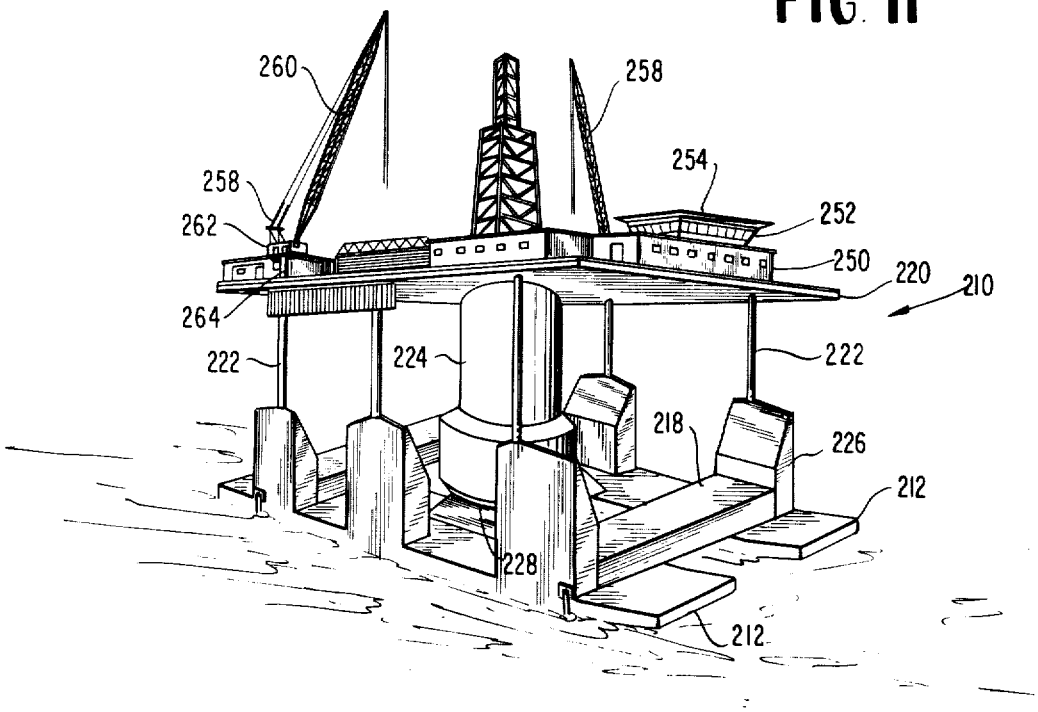
Figure 12:
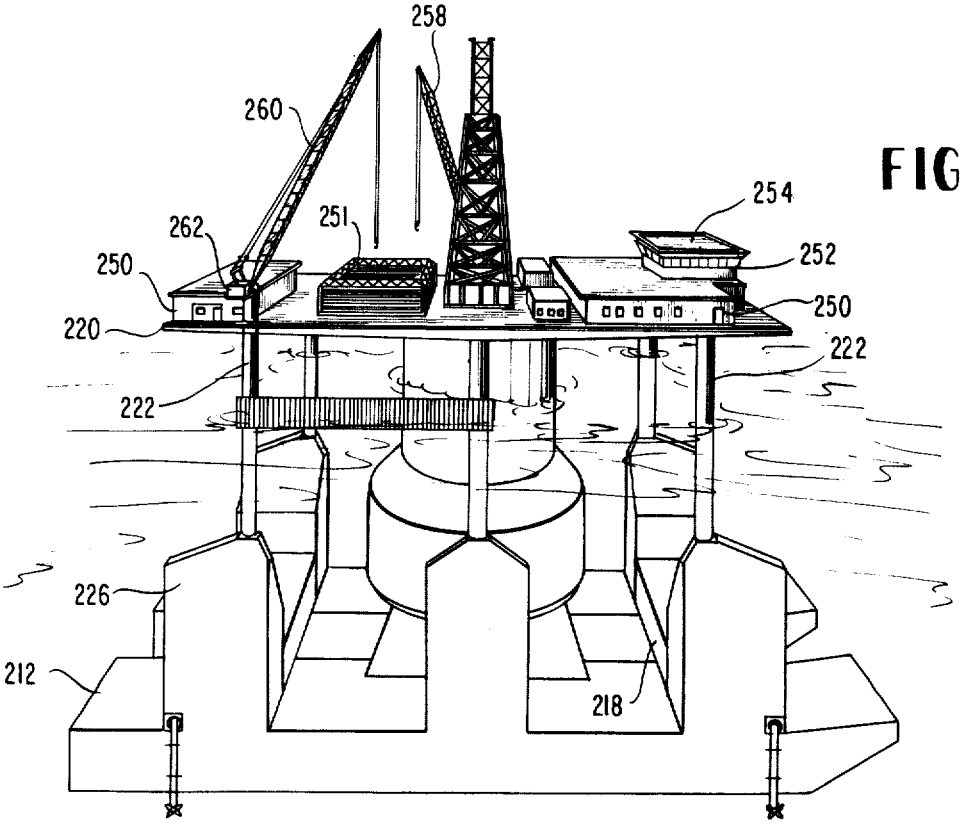
Figure 13:
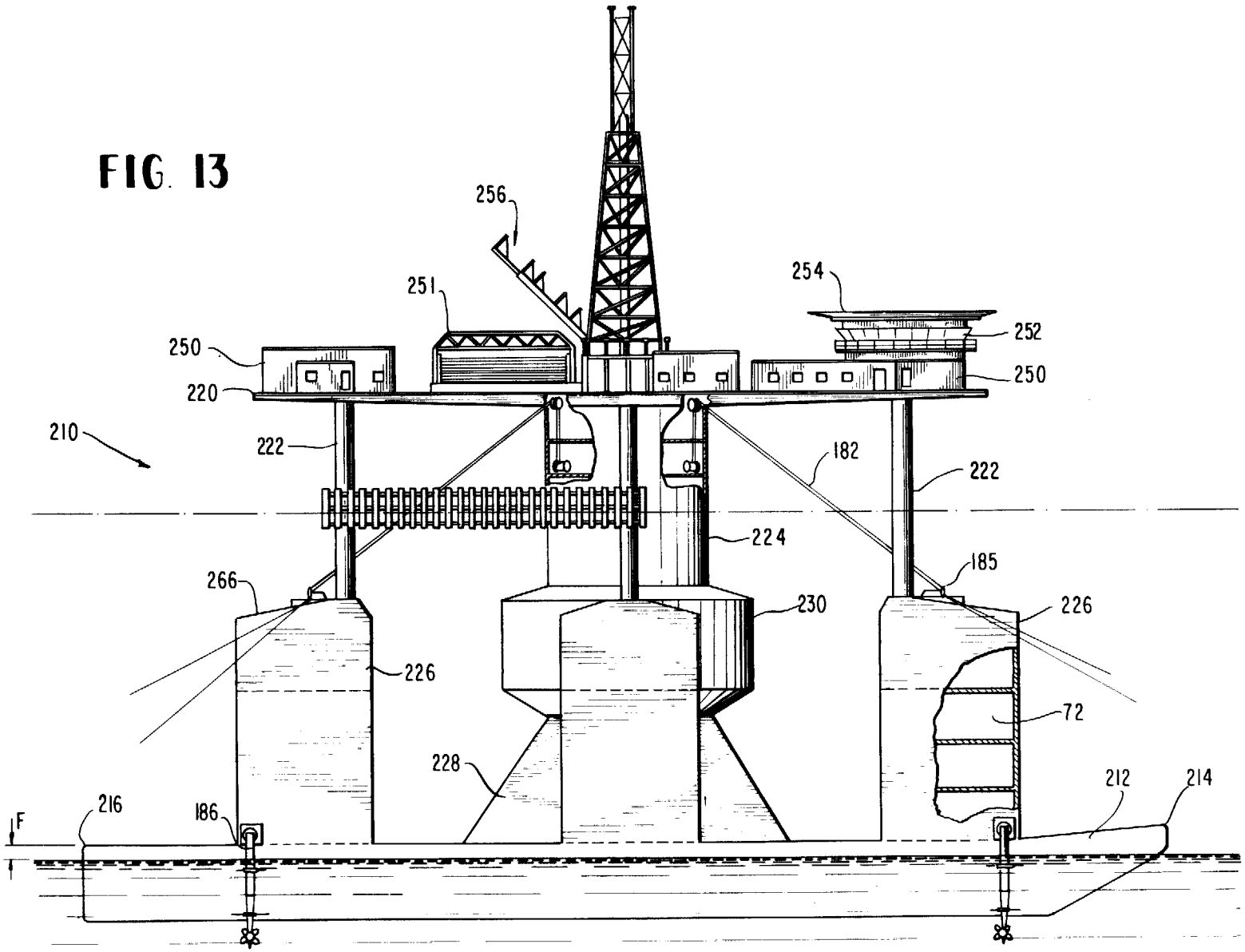

FIGS. 7, 8 and 9 are cross sectional views thereof taken generally about on lines 7—7, 8—8, and 9—9 in FIG. 6;

FIG. 10 is a schematic view of one of the hulls of the vessel illustrating a ballast system therefor;

FIG. 11 is a perspective view of another embodiment of a twin hull variable draft vessel constructed in accordance with the principles of the present invention and illustrated in a low draft towing condition;

FIG. 12 is a perspective view of the vessel illustrated in FIG. 11 in a high draft drilling condition;

FIG. 13 is a side elevational view thereof;

FIG. 14 is an end elevational view thereof; and

Figure 15:
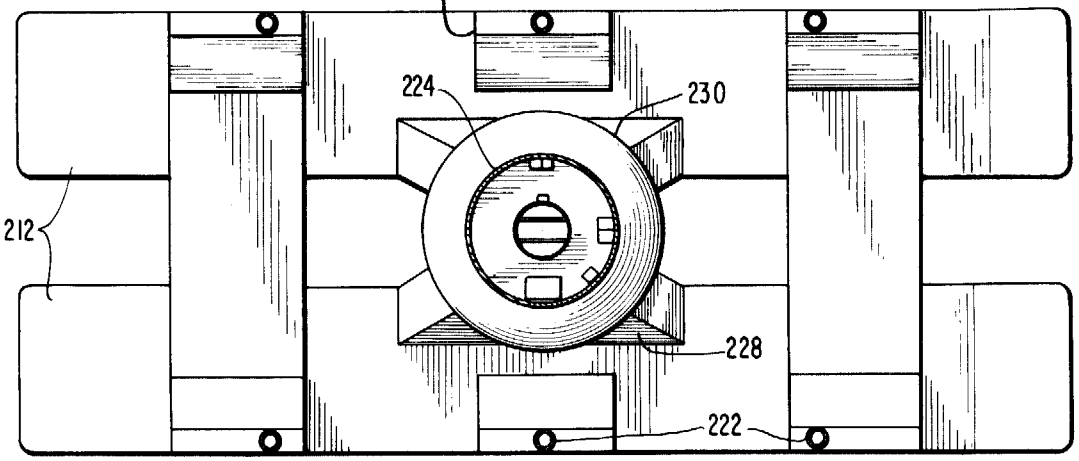

FIG. 15 is a horizontal cross sectional view thereof taken generally about on line 15—15 in FIG. 14.

Figure 3:
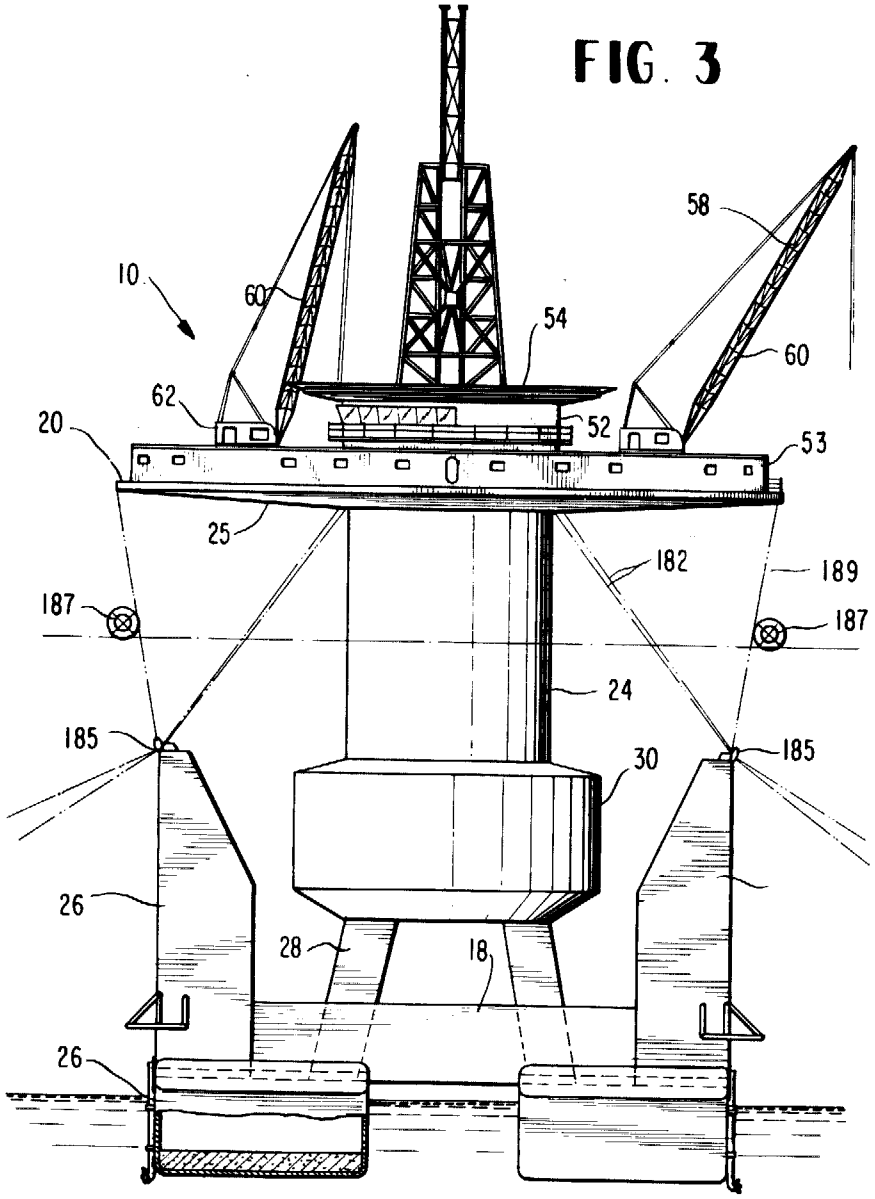
FIG. 3 is an end elevational view thereof.
Figure 1:
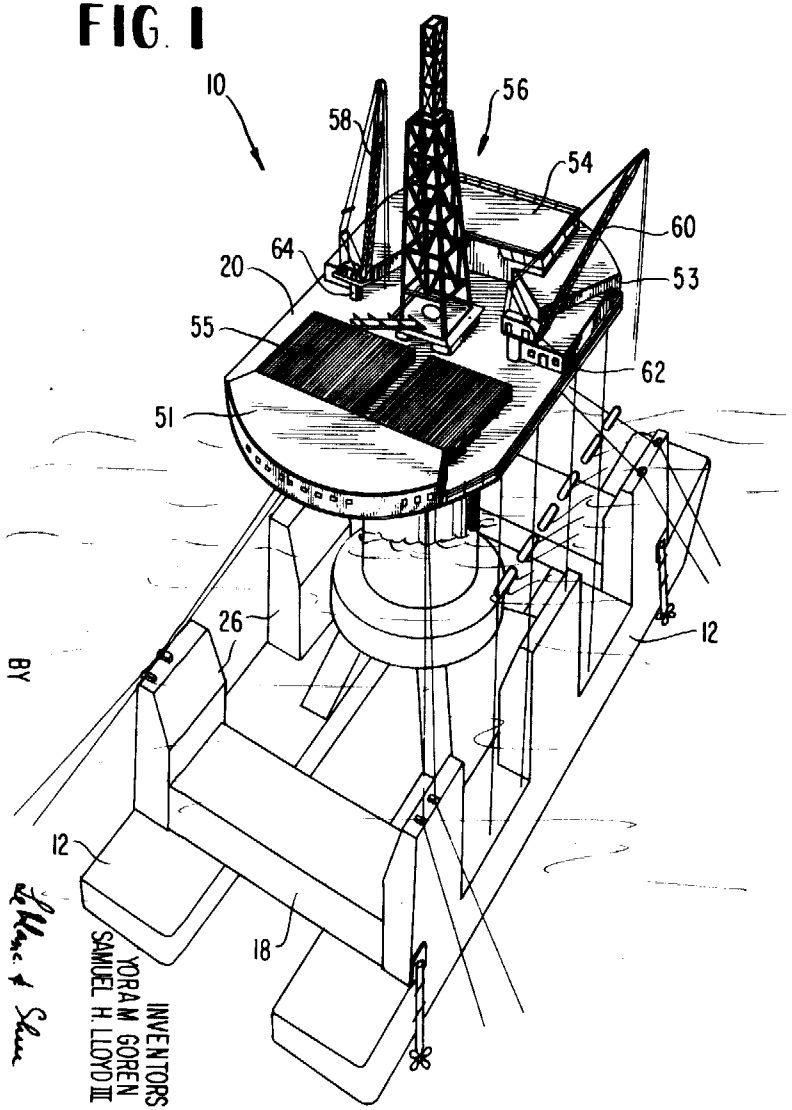
FIG. 1 is a perspective view of a twin hull variable draft vessel constructed in accordance with the principles of the present invention and illustrated in a high draft condition.
Figure 2:
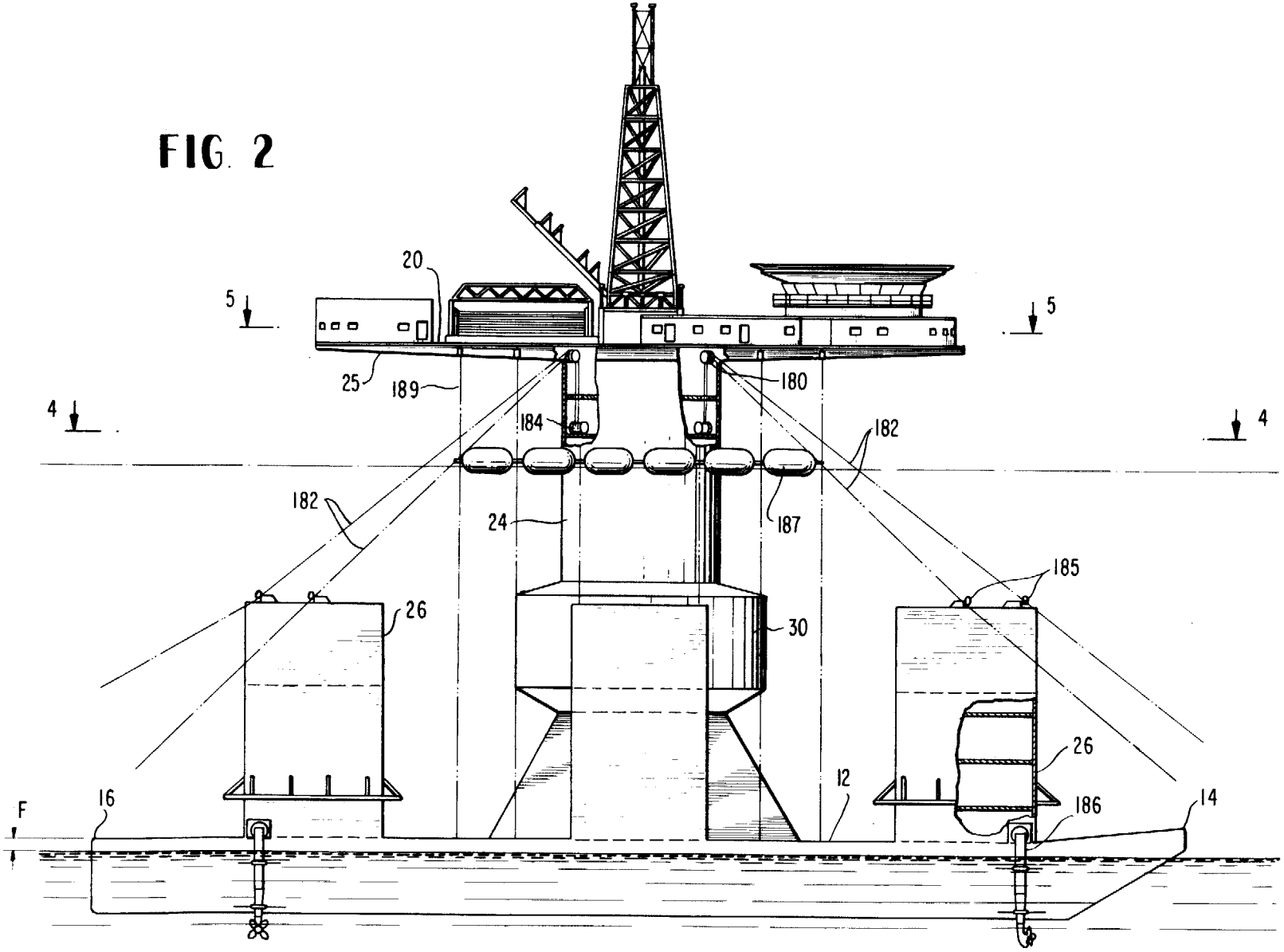
FIG. 2 is a side elevational view thereof.

Referring now to the drawings, particularly to FIGS. 1—3, there is illustrated a variable draft vessel, generally indicated 10, comprising a pair of tranversely spaced, elongated hulls 12 extending in parallel relation one to the other and providing sufficient displacement to support vessel 10 in a low draft floating condition with the hulls having freeboard indicated at f in FIG. 2. Hulls 12 are substantially identical one with the other, each hull having a substantially rectangular cross section as illustrated in FIG. 3. Each hull 12 has designed hydrostatic properties and hydrodynamic characteristics, including being streamlined for minimum resistance to motion through the water. Each hull has a bow 14, a stern 16 and a midbody therebetween. Hulls 12 are substantially streamlined in shape to minimize resistance to movement through the water when vessel 10 is entirely supported by hulls 12 in the low draft condition with the hulls having freeboard f as illustrated in FIG. 2. Suitable longitudinally spaced box-like trusses 18 extend between the hulls 12 in overlying relation thereto and between the end pairs of columns 26 to be described. Trusses 18 provide structural connections for maintaining the hulls in spaced substantially parallel relation one to the other.

A platform or main deck 20 is supported in spaced relation above hulls 12 by a vertically extending central column 24, the lateral extremities 25 of platform 20 being cantilevered from column 24. The upper end of central column 24 is secured to platform 20 and its lower end is spaced above hulls 12, the column 24 being supported thereat by box-like structural elements 28 having generally rectangular cross sections and which extend diagonally inwardly and upwardly from hulls 12 to the underside of column 24. Particularly, elements 28 provide structural interconnection between column 24 and hulls 12 with column 24 located centrally of the vessel, i.e., the vertical axis of column 24 lies medially between hulls 12 and substantially medially of the opposite ends of vessel 10. For reasons disclosed more fully hereinafter, a plurality of columns 26 upstand from each of hulls 12 adjacent the outboard sides thereof in longitudinal spaced relation one to the other, the trusses 18 being connected at opposite ends to the inboard sides of the laterally registering columns 26.

Figure 4:
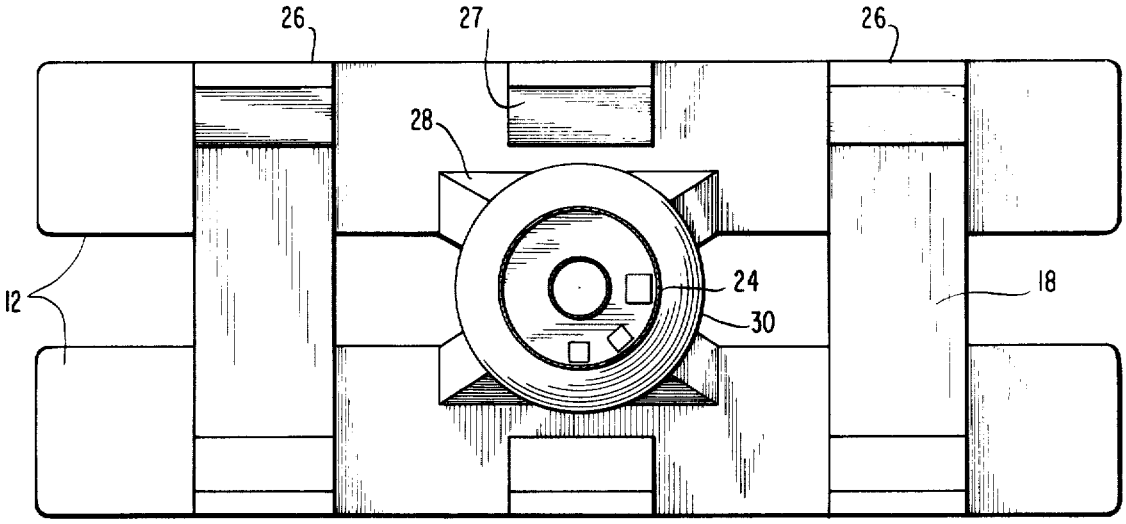
FIG. 4 is a horizontal cross sectional view thereof taken generally about on line 4—4 in FIG. 2.
Figure 5:
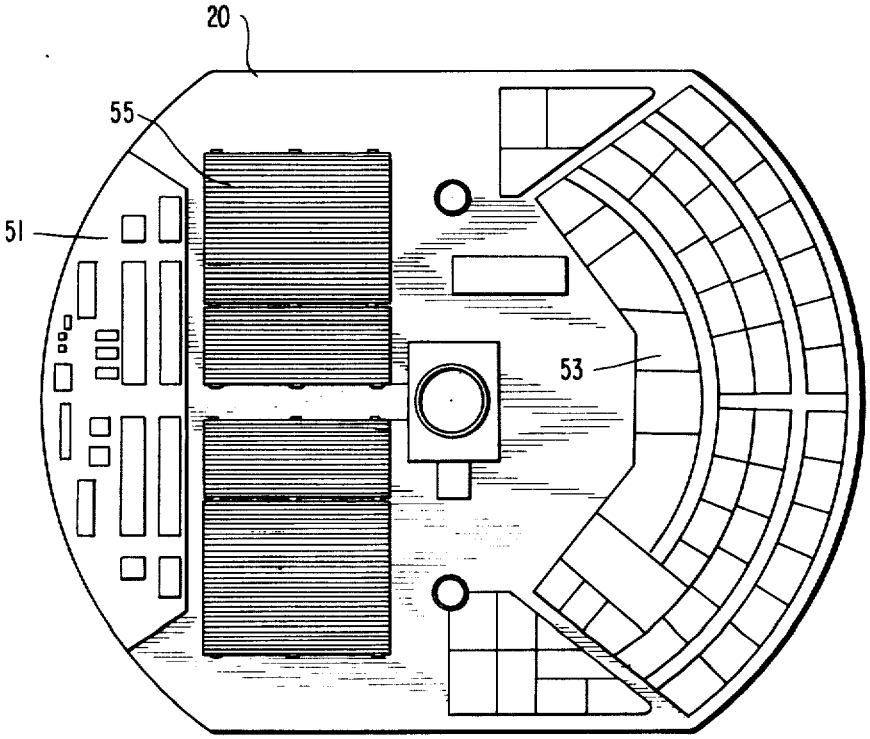
FIG. 5 is a cross sectional view of the platform taken generally about on line 5—5 in FIG. 2 and illustrating its general arrangement.

Referring to FIGS. 6–9, central column 24 includes an enlarged diameter portion 30 which forms the lower end or base of column 24. Column 24 has a central shaft 32 extending coaxially therewith for its full length. As illustrated in FIG. 1, a drilling derrick or mast 38 is carried on deck 20 centrally of the vessel 10 whereby a marine riser, not shown, can extend from derrick 38 through central shaft 32 of column 24 and between hulls 12 for conducting drilling operations as set forth more particularly hereinafter. The central column 24 comprises a plurality of decks at the various elevations thereof, the upper decks including a spider deck 40 and storage decks 42 for storing drilling supplies. The lower diametrically enlarged portion 30 of column 24 provides a mud system deck 44. It will be appreciated that the mud system deck houses mud pumps, mud mixing pumps, reserve mud tanks, etc. As illustrated, personnel and freight elevators 46 and 48 respectively are provided for access to each of these decks. Deck 20 is circular in plan view at its forward and aft ends as illustrated in FIG. 4 with its sides terminating coincident with chord lines of the circle circumscribing the fore and aft deck ends. Deck 20 includes a Texas deck comprising a plurality of deck houses 50 for housing machinery 51, crew's quarters 53, various auxiliary equipment, etc. A plurality of pipe racks 55 are provided deck 20 for storing drill pipe. Also, an upper deck is provided and includes a deck house 52 for housing various offices and additional auxiliary equipment, deck house 52 being located adjacent the forward portion of the vessel. A helideck 54 is provided above deck house 52.

The drilling equipment on deck 20 preferably includes an automatic drill pipe racking mechanism, generally indicated 56, for lifting the pipe from its storage area to a vertical position within the drilling mast for connection in the drill string. A pair of cranes 58 are mounted on opposite sides of vessel 10 and may be of any conventional design, including the usual booms 60 and operating cabs 62. Cranes 58 may have any desired capacity, for example 100 tons. Preferably, the cranes are mounted on pedestals 64.

In a preferred form hereof, columns 26 are disposed along the outboard sides of hulls 12 such that the centroids of the cross-sectional areas thereof lie outboard of the centerlines of the associated hulls. In this manner, the columns develop larger moments of inertia of the waterplane areas about the roll and pitch axes to provide stability to the vessel during its transition between high and low draft conditions as set forth hereinafter than would be the case were the columns 26 disposed along the centerlines of the hulls. Columns 26 upstand from hulls 12 a predetermined height depending upon the predicted characteristics of the vessel when the vessel makes the transition between low and high draft conditions, also as set forth more particularly hereinafter.

The vessel is provided with permanent ballast. Particularly, each hull 12 is provided with a layer of very dense concrete along its bottom. The concrete has a very high specific gravity on the order of 3.5 or 4 and comprises permanent ballast for the vessel in addition to the water ballast utilized as described hereinafter to vary the draft of the vessel between low and high draft conditions.

As illustrated in FIG. 10, hulls 12 are each divided into a plurality of compartments forming ballast chambers 70 for varying the draft of the vessel. Also, the columns 26 are divided into a plurality of compartments 72 (FIG. 3) forming ballast chambers and the ballast chambers 70 and 72 are selectively and independently ballasted and deballasted whereby the draft of the vessel can be altered between high and low draft conditions with the deck 20 remaining substantially level at each vessel draft. The ballast chambers may also be utilized to correct the trim of the vessel about both roll and pitch axes during submergence to and retention of the vessel in the high draft condition. Further, ballasting and deballasting operations can be conducted when the vessel lies in the high draft condition to change the natural period of the vessel in heave, pitch and roll, as desired. In FIG. 10, the starboard hull and ballast system therefor are illustrated and it will be understood that the port hull is similarly arranged and ballasted but is of opposite hand. Also, the ballast chambers 72 in the transitional columns 26 carried by each hull 12 are not illustrated although the ballast connections for such chambers 72 are illustrated.

Ballast chambers 70 and 72 are selectively and independently ballasted and deballasted whereby the vessel may be partially submerged, i.e., within a range between high and low draft conditions as herein set forth, with platform 20 remaining substantially level throughout the change in vessel draft. To the foregoing ends and illustrative of apparatus for accomplishing those ends, a plurality of conduits 74 extend from a centrally located pump room P in each of the hulls in opposite longitudinal directions to the several ballast chambers 70 in the hulls. For ease of illustration, four ballast compartments are shown in each of the aft and forward portions of each hull 12, it being understood that a greater number of ballast compartments are normally provided. A plurality of conduits 76 also extend from the pump room in each hull to the ballast chambers 72 in columns 26. A pair of conduits 78 extend aft from pump room P and terminate in a pair of compartments 80 which may be employed as supplemental ballast compartments or as compartments containing drilling water. While not a part of the ballasting system per se, a pair of bilge water conduits 82 extend fore and aft from pump room P into bilges of the hulls and are in communication with the ballast pumps in a manner to be described.

The pump room is provided with a sea suction inlet indicated as 84 and an overboard discharge indicated at 86 controlled by suitable power-operated gate valves 88 and 90, respectively, the hull sides being indicated by the dashed lines in FIG. 10. A pair of pumps 92 and 94 are provided to suction sea water through inlet 84, past valve 88, through pumps 92 and 94 via conduits 96 and 98, respectively, past check valves 100 and 102, respectively, and into a conduit 104 communicating with a main ballast conduit 106. Opposite ends of main conduit 106 communicate with fore and aft ballast conduits 74 and 76 through suitable selectively opened power-operated valves 108, ballast conduits 74 being arranged in parallel at opposite ends of main conduit 106. With valves 88, 100 and 102 open, the ballast compartments in each hull, as well as the three illustrated ballast compartments in each of the columns 26 on each hull, may be ballasted with sea water by selective operation of valves 108. Preferably, no more than two compartments are ballasted at [a] any one time to facilitate maintenance of the vessel at an even keel when ballasting to the high draft condition.

To refloat vessel 10 with the hulls 12 having freeboard, valve 88 is closed and valves 90, 108 and 110 are opened. Pumps 92 and 94 operate to pump water in the same direction as before and, accordingly, suction main conduit 106 through conduit 112. By selective operation of valves 108, ballast water from the ballast compartments can be discharged through conduit 104, open valve 90, and outlet 86. Preferably, no more than two ballast compartments are deballasted at any one time and this permits maintenance of the vessel at an even keel when deballasting to the low draft condition.

Conduit 114 connects the port and starboard pump rooms and communicates with ballast conduit 106. By activating the appropriate valves, including valve 116 in conduit 114, ballast can be transferred from one hull to the other. In the event that one pump room becomes flooded due to extreme damage, the ballasting system can be controlled by opening valve 116 and controlling the ballast system with the pumps in the other hull.

The ballast/drilling water conduit 78 are also connected in parallel to the aft end of main conduit 106 through suitable valves 118 similar to valves 108. Thus, the ballast/drilling compartments 80 can be ballasted, deballasted and selectively ballasted and deballasted similarly as compartments 70 and 72 by selected operation of valves 118 and the aforementioned valves 88, 90 and 110.

A fresh water intake or filling conduit 120, communicating with deck 20 via an uptake conduit 122, and a fresh water suction conduit 124, communicating with the ship's service fresh water pump 126, each communicate with a fresh water compartment 128 located aft of the [pumproom] *pump room* on the inboard side of the hull. A conduit 129 communicates between fresh water pump 126 and deck 20 via uptake conduit 130. A pair of fuel oil suction conduits 132 communicate with fuel oil tank 134 located forward of the [pumproom] *pump room* on the inboard side of the hull and provides fuel oil to the machinery deck via an uptake conduit 136 by means of fuel pump 138. Drill water is pumped from the aft drilling water compartment 140 and the ballast/drilling compartments 80 via conduits 142 and 78, 144, respectively, into a main drill water conduit 146 by a pump 148 which delivers the drill water via suitable valve 150 to deck 20 via an uptake conduit 152. A drill water conduit 154 communicates with the forward drilling water compartment 156 and provides drill water to deck 20 via pump 148 and conduit 152. Suitable valves 158 are provided in conduits 142 and 144 and these together with valve 156 in conduit 154 are selectively operable to fill and suction compartments 80, 140 and 156, whereby drill water may be transferred to and from the drilling rig and may be employed for the purposes of ballasting and deballasting the vessel.

When vessel 10 lies in the low draft condition illustrated in FIG. 1 with the hulls having freeboard f, the center of buoyancy of vessel 10 is spaced below its center of gravity with hulls 12 providing stability to the vessel in the low draft in-transit condition. In the high draft condition illustrated in FIG. 2, the orientation of these two parameters is reversed. That is, the center of buoyancy of the vessel in the high draft condition is disposed above the center of gravity of the vessel. Particularly, when the vessel is ballasted to make the transition from the low draft condition to the high draft condition, i.e., when the vessel draft is gradually increased from the low draft condition, the center of buoyancy of the vessel rises and its center of gravity is lowered. Conversely, when the vessel is deballasted to make the transition from the high draft condition to the low draft condition, i.e., when the vessel draft is gradually decreased from the high draft condition, the center of buoyancy of the vessel is lowered and its center of gravity rises. During this transition, a vessel orientation is obtained at a predetermined vessel draft wherein the center of buoyancy of the vessel and its center of gravity lies substantially in a common horizontal plane or at a common elevation. In order to provide stability to the vessel during transition between high and low draft conditions, and also as set forth more particularly hereinbelow to minimize the area of the vessel exposed to wind and wave action whereby the vessel in the high draft condition is substantially less responsive to excitation forces caused by wind and wave action, columns 26 extend upwardly from hulls 12 a predetermined height effective to provide righting moments during transition of the vessel between high and low draft conditions and particularly at vessel drafts wherein the center of buoyancy lies below and at an elevation common with the center of gravity of the vessel. Thus, when the vessel is ballasted as previously described, columns 26 are effective upon submersion of hulls 12 to provide righting moments about roll and pitch axes to maintain vessel stability as its draft is increased from the low draft condition.

[To afford brevity of description, the following definitions are provided: Motion minimizing characteristics are those vessel characteristics which minimize vessel motion due to excitation forces caused by wind and wave action, and are provided the vessel in the high draft condition by specifically designing the cross sectional area and configuration of said columns, distributing the weight of the vessel and formulating the geometry of the submerged portions of the vessel in the high draft condition such that the vessel obtains a natural period in heave, pitch and roll outside the range of periods of anticipated waves and reduced area at the mean waterline; Low draft condition is that draft wherein the vessel floats with its hulls having freeboard; High draft condition is that draft wherein the vessel floats with the mean waterline located intermediate the deck 20 and the upper ends of columns 26 and is the draft at which drilling operations are conducted; Near low draft range is that range of vessel drafts in which the center of buoyancy lies below the center of gravity of the vessel and in which the mean waterline lies coincident with or above the upper surface of the hulls; and Near high draft range is that range of vessel drafts wherein the center of buoyancy of the vessel lies above its center of gravity and excluding the high draft condition. Also, the center of gravity and the center of buoyancy are variously referred to herein as c.g. and c.b. respectively.]

As will be recalled, the center of buoyancy lies below the center of gravity of the vessel in the low draft condition and through the near low draft range. As the vessel draft increases through the near low draft range from the low draft condition, the centers of buoyancy and gravity move relative to the vessel toward one another. Such movement continues through a vessel elevation whereat they pass one another, i.e., the vessel draft leaves near low draft range and enters the near high draft range. Columns 26 are located and provide waterplane areas throughout such increase in vessel draft in the near low draft range such that they generate righting moments sufficient to provide stability to the vessel. As the vessel is further ballasted, and its draft enters the near high draft range and approaches the high draft condition, the centers of buoyancy and gravity move relatively away from one another with the center of buoyancy being disposed above the center of gravity. As the draft increases through the near high draft range toward the high draft condition, the contribution to overall vessel stability afforded by the righting moments of columns 26 relatively decreases in comparison with the contribution to overall vessel stability provided by the righting moment generated by the increasing vertical distance between the centers of gravity and buoyancy, the c.g. being located below c.b. As the draft increases, this latter "pendulum type" stability, (i.e., c.g. located below c.b.), becomes the dominant contributor to the overall stability of the vessel. At a particular vessel draft in the near high draft range, columns 26 are completely submerged and do not contribute to stability.

The foregoing described stability characteristics are graphically illustrated in the following chart wherein the stability characteristics of the vessel as it makes the transition from the low draft condition to the high draft condition are set forth in terms of the standard formula $GM = (KB - KG) + BM$ wherein GM is the metacentric height, KB and KG are the vertical heights of the center of buoyancy and the center of gravity respectively above the lower extremity of the vessel (defined by a plane containing the lower surfaces of the hulls) and BM is the metacentric radius I/V (I being the transverse or longitudinal moment of inertia of the waterline and V being the displaced volume to the waterline in question);

| Draft Condition | (KB−KG) | +BM | =GM |
|---|---|---|---|
| Low Draft | Negative Value | Large Positive Valve | Positive Value +BM (KB−KG) |
| near low draft range | negative value and decreasing in magnitude to 0 as draft increases | positive value | Positive Value +BM+[−(KB−KG)] |
| near high draft range | positive value and increasing in magnitude as draft increases large positive value | positive value small when only waterplane area is that of the central column | Positive Value +BM+[+(KB−KG)] |
| high draft | | small positive value | Positive Value +(KB−KG)+BM |

Furthermore, the enlarged diameter lower end portion 30 of central column 24 is located to raise the center of buoyancy as the vessel draft increases through the near high draft range to the high draft condition. This enlarged portion 30 becomes effective after the center of buoyancy shifts above the center of gravity, i.e., after the "pendulum type" stability is obtained. Since the righting moment provided by this "pendulum type" stability becomes predominant, and to minimize the response of the vessel to excitation forces, columns 26 are terminated at their upper ends well below the location of the mean waterline when the vessel lies in the high draft condition. More particularly, columns 26 terminate at their upper ends at an elevation coincident with the mean waterline when the vessel obtains a draft in the near high draft range wherein sufficient "pendulum" stability is afforded the vessel to maintain the vessel stability required. Columns 26 are thus effective to provide vessel righting moments about the roll and pitch axes at least at vessel drafts wherein the center of buoyancy is spaced below the center of gravity and wherein the centers of buoyancy and gravity lie at a common elevation, i.e., throughout the near low draft range. Vessel stability in the near high draft range and in the high draft condition is thus provided by the large righting moment generated by the location of the center of gravity below the center of buoyancy with lesser and minimum contribution to stability afforded by the central column.

To facilitate transition of the vessel between drafts wherein the columns 26 provide the sole stability to the vessel (from the low draft condition through the near low draft range) and a draft wherein the vessel obtains stability comprised predominantly of the "pendulum type" stability (i.e., the c.g. located below c.b.) with minimum stability contribution from the waterplane area of the central column (i.e., through the near high draft range and in the high draft condition), the upper portions of columns 26 are formed to gradually decrease in cross sectional area toward deck 20. This decrease in cross sectional area commences at an elevation above hulls 12 substantially coincident with the mean waterline at a vessel draft wherein the effects of the position of the center of buoyancy in relation to the center of gravity and the waterplane area of the central column combine to afford the vessel adequate stability while in the fully loaded condition. Particularly, the upper inside faces 27 of columns 26 are tapered outwardly and upwardly to form truncated wedges and the cross sectional area of the columns accordingly gradually decreases in a direction toward deck 20. It will be appreciated that columns 26 are elongated in the direction of the axes of the hulls and that this affords greater righting moments as the vessel draft changes than would be the case if the columns were circular wherein the centroid of the columns would lie closer to the axis of inclination of the vessel. Also, in the high draft condition, the columns 26 are fully submerged and the mean waterline is located intermediate the upper ends of columns 26 and the underside of deck 20.

Turning to FIG. 2, pairs of mooring pulleys 180 are mounted about and at the upper end of column 24. Anchor lines 182 are received through the pulleys and are reeved over double drum winches 184 located on deck below the spider deck (FIG. 6). Each pair of anchor lines 182 extends through sheeves 184a located at the upper end of column 24 and through a fairleader 185 located at the top of columns 26. The anchor lines carry anchors, not shown, at an 8 point mooring system for maintaining vessel 10 in position over the drill site. A pair of dynamic positioning and propulsion thrusters 186 are secured adjacent opposite ends of each of hulls 12. The thrusters are fully rotatable 360° and are utilized to accurately maintain the vessel in position over the drill site. Control of the thrusters is provided from signalling devices which may comprise either an acoustical system utilizing transponders located on the ocean floor or from tension indicators on the anchor lines, neither of which are described or illustrated in detail herein. It will be appreciated that dynamic thrusters 186 may be utilized in conjunction with the anchoring system, for example, in water depths up to 600 feet, whereas in deeper water the dynamic positioning devices alone maintain the vessel on station. Portable pneumatic rubber fenders 186 may be provided along the vessel's waterline on wire rope guides 189 connected between deck 20 and hulls 12.

Referring to the embodiment hereof illustrated in FIGS. 11-15, there is disclosed a vessel constructed similarly in most particulars as the foregoing described vessel except as herein noted and comprising a pair of transversely spaced elongated hulls 212 supporting a main deck 220 in spaced relation above the hulls by a plurality of supports 222 and a vertically extending central column 224. Hulls 212 and central column 224 are identical in construction with the hulls 12 and column 24, respectively, described in the previous embodiment. Hulls 212 are connected one to the other by box-like trusses 218 and trusses 228 converge upwardly from hulls 212 for supporting column 224 similarly as in the prior embodiment. Deck 220 includes a plurality of deck houses 250 for housing machinery, crew's quarters and various auxiliary equipment, etc. Pipe racks 251 are provided on deck 220 for storing drilling pipe. A deck house 252 housing various offices and additional auxiliary equipment is carried on deck 220, a helideck 254 being provided above deck house 252. The drilling equipment on deck 220 includes the automatic drill pipe racking mechanism 256 and cranes 258 including booms and cabs 260 and 262, respectively, the cranes being mounted on pedestals 264.

The primary difference between the form of vessel disclosed in FIGS. 11-15 and the embodiment of the vessel previously described resides in the rectangular plan form of deck 220 and the direct support therefor from the hulls in contradistinction to the cantilevered support for deck 20 from the central column 24 as disclosed in the prior embodiment. Particularly, deck 220 is generally rectangular in plan form and is supported not only by central column 224 but also by a plurality of supports 222. Particularly, supports 222 comprise elongated structural elements extending vertically between deck 220 and hulls 212 adjacent the outboard sides thereof. As illustrated, three support elements 222 are provided in longitudinally spaced positions along the lateral extremity of each of the hulls and provide structural support for deck 220 adjacent its outer extremities. As in the previous embodiment, a plurality of columns 226 upstand from each of hulls 212 adjacent the outboard sides thereof in longitudinal spaced relation one to the other. In this form, however, each column encompasses or fully encloses a lower portion of the associated upstanding structural element 222. The central supports 222 bisect the intermediate columns 226 on each hull while the columns 226 at opposite ends of the hulls are located with respect to the associated support elements 222 such that major portions of the columns lie fore and aft respectively of the associated fore and aft elements 222. As in the previous embodiment, the upper ends of columns 226 are formed to gradually decrease in cross sectional area toward deck 220. This decrease in cross sectional area commences at an elevation above hulls 212 similarly as described with respect to the previous embodiment and is provided by tapering the inside faces of the columns outwardly and upwardly to form truncated wedges. Also, the upper edges of the columns are tapered in a fore and aft direction and this provides for a further gradual transition in vessel draft between the two types of stability provided the vessel at drafts respectively in the near low draft range and in the near high draft range and in the high draft condition as previously set forth. Particularly, the longitudinally outboard portions of the upper ends of the columns located at opposite ends of the hulls are tapered gradually away from the vessel's transverse centerline as indicated at 266. The upper ends of the intermediate columns 226 on each hull taper gradually toward the associated support element 222. The vessels of the two specific embodiments herein set forth are similar in all other respects. It will, however, be appreciated that the waterplane areas of the upper portions of support members 222 are substantially insignificant in terms of the righting moments produced thereby in comparison with the righting moment produced by the "pendulum type" stability obtained in the near high draft range and in the high draft vessel condition.

The operation of a vessel constructed in accordance with the present invention will now be described and is written, for brevity and except as otherwise indicated, with respect to the preferred embodiment hereof illustrated in FIGS. 1–10, it being appreciated that the description applies also to the embodiment illustrated in FIGS. 11–15. It is a significant feature hereof that the vessel 10 can be towed between drilling sites at speeds on the order of 8 knots providing the present vessel with significant mobility between drilling sites. The hulls 12 have a displacement when deballasted to support the entire weight of the vessel in the low draft floating condition with the hulls 12 having freeboard. Thus, when floating, the vessel 10 has the righting stability and roll angle characteristic of a twin hulled vessel. It will be appreciated that the support bracing interconnecting the hulls is located adjacent the top surface of the hulls and hence above the waterline, whereby the bracing does not present a front area to the water to offer resistance to passage therethrough. In the low draft floating condition, only twin hulls 12 displace water and the hydrodynamic characteristics of the hulls, particularly their substantially streamlined bows, as well as the absence of support structure in contact with the water, minimizes resistance to passage through the water and permits the towing of the vessel at significantly higher speeds than heretofore possible with prior semisubmersible platforms (the vessels disclosed in application Ser. Nos. 766,662 and 705,175 excepted).

When vessel 10 reaches the drilling site, the mooring system and propulsion thrusters are activated to locate and maintain the vessel over the drill site. In relatively shallow water depths, for example, water depths not exceeding 600 feet, the anchors and anchor lines are deployed to maintain the vessel directly over the drilling site. The hulls 12 are then ballasted to submerge the hulls below the waterline. As the vessel is ballasted and the hulls submerged and the vessel draft increases through the near low draft range, the moment of inertia of the waterplane areas of the columns 26 maintain the vessel stable as the centers of buoyancy and gravity shift relative to the vessel toward one another from an initial location in the low draft condition wherein the c.b. is below the c.g. As the draft of the vessel increases and the vessel enters the near high draft range, the c.b. and the c.g. shift past one another with the c.b. being then located above the c.g. As noted previously, when the vessel draft is such that the c.b. lies below and at a common elevation with the c.g., stability is obtained by virtue of the righting moments provided by columns 26. As the vessel draft increases and the vessel enters the near high draft range, the center of buoyancy, particularly due to the lower enlargment of the central column, rises substantially above the center of gravity of the vessel, whereupon stability is increasingly obtained by the increasingly large righting moment provided by locating the c.g. below the c.b., i.e., the vessel obtains "pendulum" stability. This latter type of stability becomes predominant relative to the righting moments provided by the columns 26 and sufficient, as the draft increases, to maintain vessel stability in the high draft conditions. To facilitate transition between the form of stability obtained in the low and near low draft conditions and the form thereof obtained in the near high and high draft conditions, the upper portions of the columns 26 decrease in cross sectional area whereby their contribution to vessel stability gradually diminishes and becomes zero when the vessel obtains a draft wherein the mean waterline is located above the upper ends of columns 26. The contribution to overall vessel stability afforded by the waterplane areas of the structural elements 222, in the latter described form of the present invention, is not significant in comparison with the "pendulum" stability afforded the vessel by the reorientation of the c.g. and c.b. in the near high draft range and in the high draft condition. Moreover, when the vessel obtains a draft with the mean waterline located intermediate deck 20 and the upper ends of columns 26, the area against which wave excitation forces act comprises substantially solely central column 24 in the first embodiment hereof and the central column 224 and support elements 222 in the second embodiment hereof. This factor contributes significantly toward the minimization of vessel motion. It will be appreciated that the ideal high draft condition of the vessel is obtained at a draft wherein the mean waterline lies substantially medially of the upper ends of columns 26 and the underside of deck 20. Furthermore, in the high draft condition, the distance from the upper ends of columns 26 to the underside of deck 20 exceeds the height of the maximum anticipated wave from crest to trough. It will be appreciated that as the draft of the vessel increases, and where anchors are employed, the anchor lines are maintained at a predetermined tension by operation of the winches to maintain the vessel over the drilling site.

At the predetermined high draft condition, the displacement of the submerged columns and the residual displacement of the hulls are sufficient to maintain the vessel in the floating high draft condition. In this condition, not only is adequate and "pendulum type" stability provided, but also the vessel obtains minimum response to excitation forces whereby the vessel's motions are significantly reduced, the vessel becoming a stable platform. Further, to avoid interaction of wave and vessel motion and thus further minimize overall vessel motion, the vessel is configured such that the undamped natural periods of the vessel in heave, pitch and roll in the high draft condition are beyond the peak periods encountered in virtually all seas where drilling operations are presently performed or may possibly be performed in the future. The fully damped natural periods of the vessel will, of course, put such periods well beyond the peak periods of seas in virtually any part of the world. The undamped natural periods are predicted as follows: heave — about 28 seconds; pitch or roll — about 51 seconds.

Drilling operations are conducted in the high draft condition of the vessel as illustrated in FIG. 2. The marine riser and drill string are disposed through the shaft 32 of central column 24. The vessel may be maintained on station over the drill site by operation of the dynamic thrusters 186 or alternately tensioning or releasing the anchor lines as necessary and applicable.

After drilling operations are completed, vessel 10 is deballasted to obtain the low draft condition. Particularly, the ballast compartments are pumped to evacuate the water therein as hereinbefore described. As the vessel is deballasted, the vessel draft decreases through the near high draft range with the c.b. and c.g. moving toward one another, the c.b. being initially above the c.g. in the high draft condition. As the vessel draft decreases, its stability decreases to a limited extent due to such movement of c.b. and c.g. However, before the vessel obtains a draft wherein c.b. and c.g. lie at a common elevation along the vessel, the tapered upper ends of columns 26 emerge and the waterplane area of such columns and their location outboard of the roll and pitch axes of the vessel afford righting moments which gradually increase in magnitude as the draft decreases until the full waterplane area of the column becomes effective to provide such righting moments. Thus, before c.b. is lowered and c.g. rises to the extent that they obtain a common elevation, the columns are fully emerged such that their maximum waterplane area becomes effective to provide stability to the vessel. As the draft decreases upon further deballasting, the c.b. and c.g. pass one another and the vessel enters the near low draft range with c.g. above c.b. In this latter range, stability is provided solely by the righting moments generated by columns 26 until the hulls 12 emerge whereupon the stability is that characteristic of a twin hulled vessel.

The illustrative preferred embodiment of a vessel constructed according to the present invention, as illustrated in FIG. 1, has an overall length of 360 ft. at hulls 12 with each hull having a beam of 55 ft. and inside spacing of 40 ft. from each other, providing an overall vessel beam of 150 ft. The depth of the deck above the bottom of the hulls is 175 ft. The depth of the hulls is 25 ft. and the height of the columns 26 from the upper surface of the hulls is 80 ft. The columns 26 have a length in the longitudinal direction of 45 ft. and a width of 25 ft., the outboard sides thereof forming continuations of the outboard sides of the associated hulls. In the low draft condition, the waterline lies approximately 5 ft. below the upper surfaces of hulls 12. In the high draft condition, the waterline lies approximately 40 ft. below the underside of deck 20, i.e., about 35 ft. above the upper ends of columns 26. It will be appreciated that in the high draft condition of the vessel, the mean waterline is located such that the maximum anticipated wave does not act either against deck 20 or the upper ends of columns 26. The deck 20 has an overall length of about 214 ft. and a width of 174 ft. Central column 24 has an overall height of 108 ft. and a diameter of 52 ft. The enlarged lower end portion 30 of column 24 has a diameter of 80 ft. and the shaft 32 through central column 24 has a diameter of 18 ft. As illustrated in FIG. 6, the lower end of column 24 tapers upwardly from its 52 ft. diameter to an 80 ft. diameter at the enlarged lower portion 30 through a distance of 8 ft. The enlarged portion 30 extends vertically therefrom a distance of 30 ft.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A variable draft vessel comprising:

a pair of elongated flotation members disposed in spaced side-by-side substantially parallel relation one to the other, said flotation members having a combined displacement sufficient to float the vessel in a low draft condition with the flotation members having freeboard and constituting substantially the entirety of the flotational support for said vessel in said low draft condition;

a working platform;

means connected between said working platform and said flotation members to support said working platform in fixed spaced relation above said flotation members;

a plurality of elements carried by said vessel between said flotation members and said platform with at least one of said elements comprising at least part of said connecting means;

said elements including a central, substantially vertically disposed, column *located substantially at the vessel's central vertical axis* and a plurality of stabilizing members spaced laterally outwardly of said central column and one from the other;

the upper portions of said stabilizing members being spaced below said platform;

means for ballasting and deballasting the vessel to respectively submerge the flotation members, stabilizing members and a portion of said central column thereby to provide a high draft floating condition with the water line located intermediate the height of said central column and to return the vessel to the low draft condition, said *stabilizing* members being located and having waterplane areas sufficient to provide stability to the vessel during at least a portion of its transition between low and high draft conditions, the displacement of the submerged flotation members, stabilizing members and said portion of the central column being sufficient to maintain the vessel buoyant in the high draft condition;

the vertical spacing between said platform and said flotation members being identical in both said high and low draft conditions of said vessel; and means carried by said platform for conducting drilling operations external to said vessel when said vessel lies in said high draft floating condition.

2. The vessel according to claim 1 wherein said stabilizing members comprise columns upstanding from said flotation members, the upper end of said central column being connected to said platform with its lower end lying at an elevation lower than the upper ends of said stabilizing columns, the upper ends of said stabilizing columns being fixed a predetermined like distance below said platform in both said high and low draft conditions of said vessel.

3. The vessel according to claim 2 wherein the cross sectional area of the stabilizing columns at an elevation above said flotation members and also [containing] *at an elevation overlapping* a portion of said central column decreases in a direction toward said platform.

4. The vessel according to claim 1 wherein its center of buoyancy is located below its center of gravity in the low draft condition and above the center of gravity in the high draft condition, said stabilizing members comprising columns upstanding from said flotation members a distance sufficient to provide waterplane areas during transition between the low and high draft conditions for vessel drafts between a draft wherein the mean waterline lies at substantially a common elevation with the lower ends of the columns and an intermediate vessel draft whereat the center of buoyancy and the center of gravity lie substantially at a common elevation, the upper end of said central column being connected to said platform and its lower end lying at an elevation lower than the upper ends of said columns.

5. The vessel according to claim 4 wherein the cross sectional area of said columns decreases in a direction toward said platform at an elevation between said platform and said flotation members at least as high as said latter mentioned common elevation.

6. The vessel according to claim 1 wherein said stabilizing members comprise columns upstanding from said flotation members, the upper end of said central column being connected to said platform and its lower end lying at an elevation lower than the upper ends of said columns, said connecting means including supports extending from the upper ends of said columns to said platform, the combined waterplane area of said supports being small in comparison with the waterplane area of said central column when said vessel lies in the high draft condition.

7. The vessel according to claim 1 wherein said central column has a diametrically enlarged portion adjacent its lower end.

8. The vessel according to claim 1 wherein said platform carries a drilling rig and said central column has an opening extending its full length, said rig being superposed over said central column for conducting drilling operations through said opening.

9. The vessel according to claim 2 wherein at least one of said columns on each of said flotation members has a cross section elongated in a direction substantially parallel to the long axes of said flotation members.

10. The vessel according to claim 2 wherein the centroids of said columns are transversely spaced from vertical planes passing through the longitudinal centerlines of said *flotation* members.

11. The vessel according to claim 2 wherein said ballasting and deballasting means includes at least two ballast compartments in each of said *flotation* members, said two ballast compartments being horizontally spaced one from the other, means for selectively ballasting and deballasting said two compartments in each said *flotation* member to alter the natural period of said vessel.

12. The vessel according to claim 1 wherein said central column provides the sole structural connection [beteeen] *between* said [base structure] *flotation members* and said platform.

13. The vessel according to claim 1 wherein said platform extends laterally beyond said central column, and means carried by said vessel for supporting said platform extensions.

14. The vessel according to claim 13 wherein said central column provides the sole structural connection between said base structure and said platform, said platform extensions being cantilevered from said central column.

15. The vessel according to claim 1 wherein the center of gravity of the vessel in the low draft condition is located above its center of buoyancy, the vessel being configured such that in the high draft condition the center of gravity therein is located below its center of buoyancy.

16. The vessel according to claim 1 wherein said flotation members comprise hulls substantially rectangular in cross section and having a greater width than depth, and means connected to said hulls adjacent the upper surfaces thereof and extending transversely of said vessel for maintaining the hulls in spaced substantially parallel relation one to the other.

17. The vessel according to claim 1 wherein the distance between said platform and the upper ends of said [column] *stabilizing members* is equal to or greater than the height of the maximum anticipated wave from crest to trough, the vessel being configured such that the mean waterline in the high draft condition is about medially of the distance between said platform and the upper ends of said [columns] *stabilizing members*.

18. The vessel according to claim 1 wherein said stabilizing members comprise columns upstanding from said flotation members, the cross-sectional area of the stabilizing columns at an elevation above said flotation members and also [containing] *at an elevation overlapping* a portion of said central column decreasing in a direction toward said platform, the upper end of said central column being connected to said platform and its lower end lying at an elevation lower than the upper ends of said stabilizing columns, the center of gravity of the vessel being located above its center of buoyancy in the low draft condition and below the center of buoyancy in the high draft condition, the stabilizing members upstanding from said flotation members a distance sufficient to provide water plane areas during transition between the low and high draft conditions for vessel drafts between a draft wherein the mean waterline lies at substantially a common elevation with the lower ends of the columns and an intermediate vessel draft whereat the center of buoyancy and the center of gravity lie substantially at a common elevation, said central column having a diametrically enlarged portion adjacent its lower end and at an elevation corresponding to the elevation at which the columns decrease in cross-sectional area, said platform carrying a drilling rig and said central column having an opening extending its full length, said drilling rig being superposed over said central column for conducting drilling operations through said opening, the centroids of said columns being transversely spaced from vertical plates passing through the longitudinal centerlines of said flotation members.

19. The vessel according to claim 1 wherein its stability characteristics are characterized by the formula GM = (KG−KG) + BM wherein GM is the metacentric height, KB and KG are the vertical heights of the center of buoyancy and center of gravity respectively above the lower extremity of the vessel and BM is the metacentric radius, the vessel being configured such that in the low draft floating condition a positive valued GM is obtained comprising the sum of a positive valued BM and a negative valued (KB−KG), the vessel being configured such that in the high draft floating condition a positive valued GM is obtained comprising the sum of a positive valued BM and a positive valued (KB−KG).

20. A variable draft vessel comprising:

a base structure;

a working platform spaced above said base structure;

means connected between said working platform and said base structure to support said working platform in fixed spaced relation above said base structure, a plurality of elements carried by said vessel between said base structure and said platform with at least one of said elements comprising at least part of said connecting means;

said elements including a central substantially vertically disposed column *located substantially at the vessel's central vertical axis* and a plurality of stabilizing members spaced laterally outwardly of said central column and one from the other;

the upper portions of said stabilizing members being spaced below said platform;

means for ballasting and deballasting the vessel to respectively submerge said base structure, said stabilizing members and a portion of said central column thereby to provide a high draft floating condition with the mean waterline in the high draft condition located intermediate the height of said central column and to return the vessel to a low draft floating condition with the base structure having freeboard, said members being located and having waterplane areas sufficient to provide stability to the vessel during at least a portion of its transition between said low and high draft conditions, the displacement of said base structure, said stabilizing members and said portion of the central column being sufficient to maintain the vessel buoyant in the high draft floating condition;

the vertical spacing between said platform and said base structure being identical in both said high and low draft floating conditions of said vessel;

the vessel being configured such that in the low draft floating condition is center of gravity is located above its center of buoyancy and, in the high draft condition its center of buoyancy is located above its center of gravity; and means carried by said platform for conducting drilling operations external to said vessel when said vessel lies in said high draft floating condition.

21. The vessel according to claim 20 wherein the contribution to overall vessel stability afforded by the waterplane area of the central column in the high draft condition of the vessel is small in comparison with the much larger contribution to overall vessel stability afforded by locating the center of gravity below the center of buoyancy in the high draft condition.

22. The vessel according to claim 20 wherein said base structure includes a pair of elongated flotation members disposed in spaced side-by-side substantially parallel relation one to the other, said stabilizing means comprising a plurality of columns upstanding from said flotation members.

23. The vessel according to claim 22 wherein said stabilizing columns upstand from said flotation members a distance sufficient to provide waterplane areas during transition between the high and low draft conditions for vessel drafts between a draft wherein the mean waterline lies substantially in a common elevation with the lower ends of said columns and an intermediate vessel draft whereat the center of buoyancy and the center of gravity lie substantially at a common elevation.

24. The vessel according to claim 23 wherein said flotation members have a combined displacement sufficient to float the vessel in the low draft condition with the *flotation* members having freeboard, said platform carrying a drilling rig, said central column having an opening extending its full length, said rig being superposed over said central column for conducting drilling operations through said opening.

25. The vessel according to claim 23 wherein at least one of said columns on each of said flotation members has a cross section elongated in a direction substantially parallel to the long axes of said flotation members, the centroids of said columns being transversely spaced from vertical planes passing through the longitudinal centerlines of said members.

*26. A variable draft vessel comprising:*

*base means;*

*a working platform spaced above said base means;*

*means supporting said working platform above said base means in spaced relationship therewith, said support means including a substantially vertically disposed central column located substantially at the vessel's central vertical axis;*

*said base means including flotation means providing displacement sufficient to float the vessel in low draft condition with said base means having freeboard;*

*said base means including means forming a plurality of stabilizing compartments located about said central column so that the waterplane area of each such stabilizing compartment provides righting moment with respect to an axis of the vessel, with each such stabilizing compartment having an upper portion located at a predetermined vertical elevation below and spaced from said platform;*

*means for ballasting and deballasting the vessel to submerge said base means and stabilizing compartments and a portion of said central column thus disposing the vessel in a high draft semisubmerged operating condition with mean waterline in such high draft semisubmerged operating condition located intermediate the height of said central column above said upper portions of said stabilizing compartments and to return the vessel to a low draft floating condition with said base means having freeboard;*

*said stabilizing compartments being located and having waterplane areas sufficient to provide stability to the vessel during at least a portion of the vessel transition between said low draft condition and said high draft semisubmerged operating condition; and*

*the vessel and components thereof including said base means and working platform and central column being configured such that in said low draft floating condition the vessel's center of gravity is located above its center of buoyancy and such that in said high draft semisubmerged operating condition the vessel's center of buoyancy is located above its center of gravity.*

*27. The vessel according to claim 26 wherein said central column has a diametrically enlarged portion adjacent its lower end.*

*28. The vessel according to claim 26 wherein said platform carries a drilling rig and said central column has an opening extending its full length, said rig being superposed over said central column for conducting drilling operations through said opening.*

*29. The vessel according to claim 26 wherein said central column provides the sole structural connection between said base means and said platform.*

*30. The vessel according to claim 26 wherein vessel stabilizing characteristics are characterized by the formula* $GM = (KB-KG) + BM$ *wherein GM is the metacentric height, KB and KG are the vertical heights of the center of buoyancy and center of gravity respectively above the lower extremity of the vessel and BM is the metacentric radius, the vessel being configured such that in the low draft floating condition a positive valued GM is obtained comprising the sum of a positive valued BM and a negative valued* $(KB-KG)$*, the vessel being configured such that in the high draft floating condition a positive valued GM is obtained comprising the sum of the positive valued BM and a positive valued* $(KB-KG)$*.*

*31. A vessel according to claim 26 wherein the vessel and components thereof are such that the contribution to overall vessel stability afforded by the waterplane area of said*

*central column in said high draft semisubmerged operating condition of the vessel is small in comparison with much larger contribution to overall vessel stability afforded by location of the vessel's center of gravity below the vessel's center of buoyancy in said high draft semisubmerged operating condition.*

*32. A vessel according to claim 31 further comprising means carried by said platform for conducting operations external to said vessel when said vessel is disposed in said high draft semisubmerged operating condition.*

*33. The vessel according to claim 26 wherein:*

*said base means comprises at least one hull having hull portions supporting a plurality of columns which provide said stabilizing compartments, such stabilizing columns extending vertically upward from associated hull portions with the upper end portions of such stabilizing columns terminating below and spaced from said platform thereby providing said upper portions of said stabilizing compartments.*

*34. A vessel according to claim 33 wherein the upper end of said central column is connected to said platform and the lower end of said central column is disposed at an elevation lower than the elevation of the upper ends of said stabilizing columns.*

*35. The vessel according to claim 34 wherein such stabilizing columns have upper end portions which are at an elevation overlapping the elevation of a portion of said central column and which decrease in cross-sectional area in a direction extending upwardly toward said platform.*

*36. The vessel according to claim 26 wherein: said central column has a lower end portion disposed at an elevation below the upper ends of said stabilizing compartments, and said stabilizing compartments extend verticlly upward in relation to said base means and said central column a distance sufficient to provide waterplane areas during transition between said vessel low draft condition and said vessel high draft semisubmerged operating condition.*

*37. A vessel according to claim 36 wherein: said stabilizing compartments provide such waterplane areas during such transition between a low draft wherein mean waterline is disposed along said base means and an intermediate vessel draft wherein the vessel's center of buoyancy and its center of gravity are both disposed substantially at a like elevation with respect to said central column.*

*38. The vessel according to claim 26 wherein: said base means comprises a pair of elongated flotation members disposed in spaced side-by-side substantially parallel relation one to the other; and said stabilizing compartments comprise columns vertically upstanding from said flotation members with the lower end of said central column lying at an elevation lower than upper ends of said stabilizing columns.*

*39. The vessel according to claim 26 wherein the distance between said platform and upper ends of said stabilizing compartments is equal to or greater than the height of the maximum anticipated wave from crest to trough.*

*40. A vessel according to claim 39 wherein the vessel and its components are configured such that mean waterline in the high draft semisubmerged operating condition is disposed about medially of the distance between said platform and the upper ends of said stabilizing compartments.*

*41. A vessel according to claim 26 wherein said central column has a diametrically enlarged portion adjacent its lower end, and vertically located so as to raise the vessel's said center of buoyancy as the vessel draft increases effective after the vessel center of buoyancy passes above the vessel's said center of gravity when the vessel moves from said low draft floating condition to said high draft semisubmerged operating conditions.*

*42. A vessel according to claim 26, wherein said base means also includes solid material of high specific gravity providing permanent ballast for the vessel.*

*43. A vessel according to claim 42, wherein said permanent ballast is concrete.*

*44. A variable draft vessel comprising:*

*at least one floating body;*

*a working platform spaced above said body;*

*support means extending between said platform and said body to support said platform at a fixed distance above said body;*

*said body having a displacement sufficient to float the vessel in the low draft floating condition with said floating body having freeboard;*

*means for ballasting and deballasting the vessel to vary the draft thereof between the high draft floating condition with the mean waterline in a position intermediate said platform and said body, and a low draft floating condition with said body having freeboard;*

*said support means including a central column located at the point of intersection of the pitch and roll axes of said vessel, said column constituting a rigid connection between said platform and said body;*

*stabilizing members carried by said vessel and located about said central column with at least a pair of said members lying on each of the opposite sides of the vessel pitch and roll axis, said stabilizing members having a vertical extent sufficient to provide waterplane areas during transition between the low and high draft conditions for vessel drafts between a draft wherein the mean waterline lies at substantially a common elevation with the lower ends of said stabilizing members and an intermediate vessel draft wherein the center of buoyancy and the center of gravity lie substantially at a common elevation whereby said stabilizing members provide righting moments about the pitch and roll axes of the vessel;*

*said vessel in said high draft condition with the mean waterline above the uppermost vertical extent of said members obtaining pendulum type stability with the vessel's center of gravity lying below its center of buoyancy, the contribution to the stability of said vessel in said high draft condition afforded by the waterplane area of said central column being smaller than the contribution to vessel stability afforded by said pendulum type stability.*

*45. A variable draft vessel comprising:*

*at least one floating body;*

*a working platform spaced above said body;*

*support means extending between said platform and said body to support said platform at a fixed distance above said body;*

*said body having a displacement sufficient to float the vessel in low draft floating condition with said floating body having freeboard;*

*said support means including a central column vertically disposed at a central vertical axis of the vessel located at the intersection of the pitch and roll axes of said vessel;*

*means for ballasting and deballasting the vessel to vary the draft thereof between high draft floating condition with the mean waterline in a position intermediate said platform and said body, and a low draft floating condition with said body having freeboard;*

*means carried by said vessel and forming a plurality of stabilizing compartments located at spaced positions*

*about said central column so that waterplane area provided by each stabilizing compartment may provide righting moment with respect to an axis of the vessel, said stabilizing compartments having a vertical extent sufficient to provide such waterplane areas during transition between low and high draft conditions and for vessel drafts between a draft wherein the mean waterline lies at substantially a common elevation with the lower ends of said stabilizing compartments and an intermediate vessel draft wherein the center of buoyancy and the center of gravity lie substantially at a common elevation with said stabilizing compartments providing righting moment about axes of the vessel;*

*said vessel being configured so that when the vessel is disposed in said high draft condition with mean waterline above the uppermost vertical extent of said stabilizing compartments the vessel obtains pendulum-type stability with the vessel's center of gravity lying below its center of buoyancy, the contribution to the stability of said vessel in said high draft condition afforded by the waterplane area of said central column being smaller than the contribution to vessel stability afforded by said pendulum type stability.*

* * * * *